UNITED STATES PATENT OFFICE.

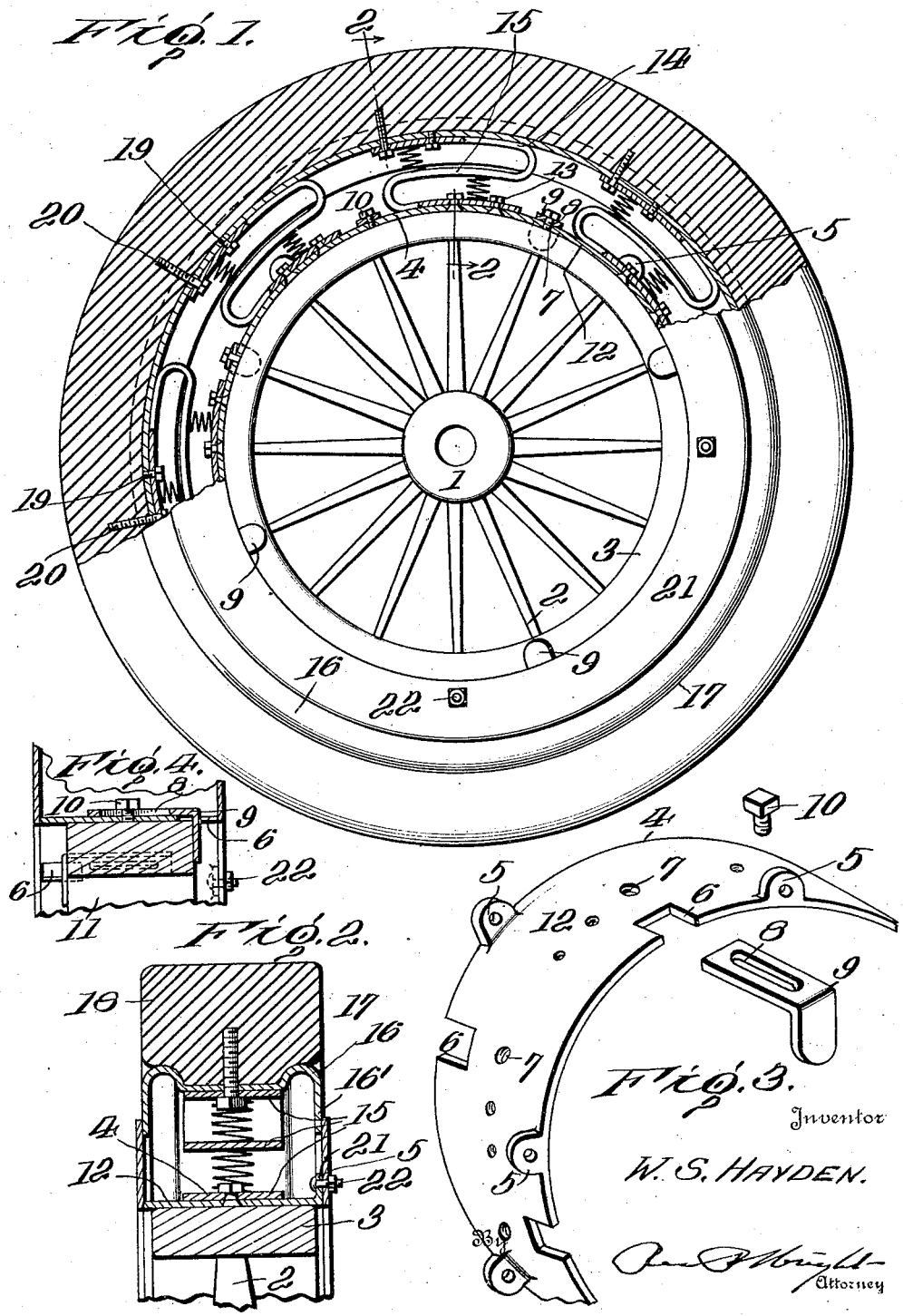

WINFIELD S. HAYDEN, OF PALMYRA, MISSOURI.

STEEL SPRING TIRE.

1,418,258. Specification of Letters Patent. Patented May 30, 1922.

Application filed October 31, 1919. Serial No. 334,840½.

*To all whom it may concern:*

Be it known that I, WINFIELD S. HAYDEN, a citizen of the United States, residing at Palmyra, in the county of Marion and State of Missouri, have invented a new and useful Steel Spring Tire, of which the following is a specification.

This invention relates to a steel spring tire adapted to be used on wheels in order to form a resilient wheel, the object being to provide a construction of spring tire with a rubber tread which can be readily placed in position on any of the well known makes of wheels now in use.

Another and further object of the invention is to provide a spring tire composed of an inner felly rim and an outer tire carrying rim connected together by substantially S-shaped springs in such a manner that a very resilient tire is formed, the springs being enclosed in a casing formed by side shields so as to protect the same from mud and the weather.

A still further object of the invention is to provide novel means for fastening the spring tire in position on the felly of the wheel.

Other and further objects and advantages of the invention will be hereinafter set forth and the novel features thereof defined by the appended claims.

In the drawings,

Figure 1 is a side elevation of a vehicle wheel showing the application of my improved construction of steel spring tire thereto, partly in section;

Figure 2 is a section taken on line 2—2 of Figure 1;

Figure 3 is a perspective view of the felly rim or inner band; and

Figure 4 is a detail section showing the tire placed in position on a narrow felly wheel.

In the drawing 1 indicates a hub, 2 the spokes and 3 the felly constituting a wheel frame of the ordinary construction now in use, the above description being given so that the application of my improved construction of steel spring tire can be readily understood.

My improved construction of steel spring tire comprises an inner felly rim or band 4 which is preferably in the nature of a flat band having staggeredly arranged threaded lugs 5 extending upwardly therefrom from opposite sides as clearly shown in Figure 3 for the purpose hereinafter fully described. The band is provided with staggeredly arranged notches 6 in its side edges in transverse alignment with threaded openings adapted to register with slots 8 formed in angled locking members 9 which are adapted to slide within the notches 6 and be secured in adjusted position by bolts 10 and it will be seen that by having these angled locking members disposed on opposite sides of the inner or felly rim, by removing the locking members on one side the band can be readily moved laterally in position over the felly and by placing the locking members back in position and forcing the same against the felly the band will be locked in position on the wheel.

This construction enables the spring tire to be secured to fellies of various widths and in Figure 4 I have shown a narrow felly 11 with my improved construction of tire in position thereon and by adjusting the fastening members on the felly rim the depending ends of the fastening members can be brought into contact with the sides of the felly so as to hold the same in its proper position thereon.

The felly rim 4 is provided with spaced threaded openings 12 arranged in pairs and in spaced relation to each other and through which bolts 13 are adapted to pass which extend through one end portion of substantially S-shaped spring members 14. These spring members are the shape of a flattened S and the loops are connected together by coil springs 15 which strengthen the S-shaped springs and increases the resiliency of the same. These springs at the same time prevent the springs from being compressed to such an extent that they might become broken when in use.

Arranged over the springs 14 is a tire carrying rim 16 preferably in the form of a channel having the central portion annularly depressed to form a channel 17 adapted to receive a resilient tire 18. The opposite ends of the S-shaped springs are secured to the inner face of the channel portion 10 of the tire carrying rim 16 by bolts 19 and 20, the bolts 20 extending through the tire carrying rim into the resilient tire for securing the same in position on the tire carrying rim as clearly shown in Figures 1 and 2.

The felly rim and tire carrying rim being of different diameters form an annular space to receive the spring members which hold the felly rim and tire carrying rim in spaced relation to one another in such a manner that the outer rim is allowed to yield in respect to the inner rim when placed under pressure.

In order to provide means for enclosing the spring members to protect them from mud and weather I secure to the lugs 5 washer shaped rings 21 forming annular shields which extend up over the sides 16' of the channel rim 16 in such a manner that a tight fit is formed in order to prevent mud and water from working up in between the contacting faces thereof as the tire yields when under compression.

The shields 16 are secured to the lugs 5 by bolts 22 so that they can be quickly removed for repairing the springs, if desired.

From the foregoing description it will be seen that I have provided a steel spring tire composed of an inner and outer band forming a felly rim and a tire carrying rim held in spaced relation by substantially S-shaped springs which are strengthened by coil springs arranged between the loops of the S's, the space between the bands being enclosed by shields carried by the felly band.

What I claim is:—

1. A spring steel tire for wheels comprising an inner felly and an outer tire carrying rim, substantially S-shaped springs disposed between said rims having their ends bent to conform to the curvature of said rims and secured thereto by spaced bolts and coil springs disposed between the loops of said S-shaped springs intermediate the spaced bolts.

2. The combination with a wheel having a felly, of a felly rim mounted thereon provided with staggeredly arranged notches in its side edges, adjustable angled fastening members working in said notches for holding said felly rim in position upon said felly, a plurality of springs disposed on the outer face of said felly rim, a tire carrying rim connected to the free ends of said springs and shields carried by the felly rim extending over the tire carrying rim.

In testimony that I claim the foregoing as my own, I have hereto affixed my signature in the presence of two witnesses.

WINFIELD S. HAYDEN.

Witnesses:
 MILTON J. GLAHN,
 THOMAS L. BANKS.